United States Patent [19]
Batdorf

[11] Patent Number: 5,786,095
[45] Date of Patent: Jul. 28, 1998

[54] INORGANIC BASED INTUMESCENT SYSTEM

[75] Inventor: Vernon H. Batdorf, Minneapolis, Minn.

[73] Assignee: H.B. Fuller Licensing & Financing, Inc., St. Paul, Minn.

[21] Appl. No.: 675,083

[22] Filed: Jul. 3, 1996

[51] Int. Cl.[6] .................................................. B32B 9/04
[52] U.S. Cl. ..................... 428/446; 428/701; 428/702; 428/921; 428/324; 428/325; 428/327; 106/600; 106/632; 427/372.2; 427/376.2; 427/397.7
[58] Field of Search ........................... 428/446, 701, 428/702, 921, 324, 325, 327; 106/600, 632, 802, 810, 814; 427/372.2, 376.2, 397.7

[56] References Cited

U.S. PATENT DOCUMENTS

| | | | |
|---|---|---|---|
| 3,513,114 | 5/1970 | Hahn et al. | 523/179 |
| 3,663,267 | 5/1972 | Moran et al. | 428/452 |
| 3,843,526 | 10/1974 | Roth et al. | 252/606 |
| 4,179,535 | 12/1979 | Kalbskopf et al. | 427/206 |
| 4,485,601 | 12/1984 | De Boel | 52/232 |
| 4,521,333 | 6/1985 | Graham et al. | 252/606 |
| 4,801,496 | 1/1989 | Buchacher | 442/414 |
| 5,434,006 | 7/1995 | Goelff et al. | 428/428 |

Primary Examiner—Timothy M. Speer

[57] ABSTRACT

An intumescent based thermal barrier system which comprises a silicate solution, an expandable microsphere intumescent agent and a frit material. The compositions of this invention can be applied to appropriate substrates to provide fire resistance.

21 Claims, No Drawings

INORGANIC BASED INTUMESCENT SYSTEM

FIELD OF THE INVENTION

The present invention relates to an intumescent based thermal barrier system. More specifically the compositions of this invention can be applied to appropriate substrates to provide fire resistance and the compositions retain their thermal barrier properties after having been stored for several years.

BACKGROUND OF THE INVENTION

There are many kinds of intumescent-type thermal barrier systems that are being used today. These thermal barrier systems are generally used on fire walls, as fire stops in buildings, with various transportation vehicles and on other suitable substrates. There are organic systems which tend to form a swelled up carbon char in a fire. However, these systems give off smoke which contains hazardous Volatile Organic Contaminants (VOC), are very susceptible to damage upon expansion and are very costly. These systems may be two component thermosetting systems such as epoxy or polyester resins, one component water-based acrylic compositions or solvent based elastomeric rubber compositions.

All of the systems described above have drawbacks. Generally, their shortcomings include high applied costs per square foot, difficulty in application due to mixing requirements a high amount of toxic smoke given off in decomposition, or the form structure breaking apart by movement or contact with falling structure materials in a fire. Further, the alkaline silicate systems known in the art rely upon the moisture held by the silicate after the product dries to create the expansion during the fire. When an aged system, i.e. a system that has been in use over one year, is used, it has generally failed.

An example of one of these systems is shown in U.S. Pat. No. 4,521,333 (Graham et al.). These systems generally fail after aging due to a slow loss of moisture in the silicate coating and a continual carbonation of the alkali from the carbon dioxide in the air. When the compositions of these silicate based systems are applied to substrates, generally after a period of approximately one year, the compositions of these systems have shown a much higher melting point, thus causing the system to lose its intumescent properties.

There is therefore, generally, a need for an intumescent-based thermal barrier system which has good structural strength, does not lose its intumescent properties after long term service and does not disadvantageously give off toxic VOC's or large amounts of smoke when fires occur.

SUMMARY OF THE INVENTION

The present invention relates to an intumescent based thermal barrier system. The system is particularly useful as a thermal barrier or as a fire stop for cables protruding through building ceilings and walls. Further, this system can be used on various substrates as a protective coating in those instances where a fire retardant is needed. Since this system is water sensitive after cure, a surface coating is desirable whenever high humidity conditions exist. Any suitable surface seal products may be used to effectuate the desirable results.

Advantageously, the present invention provides advantages that include:
1) Good structural strength of the foamed coating, thus providing a durable insulative fire barrier.
2) Substantially no heat released from the coating during intumescence.
3) The end product can be top coated with alkali-resistant finishes to provide a decorative finish.
4) Low smoke and low toxicity of gasses given off in a fire.
5) Low cost.
6) Can be built up in one coating of at least about 1.0 cm wet thickness.
7) Good adhesion to steel, fiberglass reinforced polyester panels, concrete and other construction materials.
8) Can be used with a primer on other substrates such as wood, drywall, and other organic foam insulation.
9) A one component water-based product with no VOC's that is easy to apply by spray, trowel, brush, roll coat or other conventional types of application methods.
10) Does not lose its intumescent properties after it was stored for at least about four (4) years.

The intumescent based thermal barrier system of the present invention includes an effective amount of silicate solution, water, an expandable microsphere intumescent agent and an aluminum silicate. Particularly preferred embodiments of the present invention include an intumescent thermal barrier system and its compositions which include about 40 to 85 wt-% of a silicate solution, about 2–15 wt-% of an expandable substantially microspherical intumescent agent and about 5–40 wt-% of a frit material.

The system of the present invention can include optional ingredients such as fillers, defoamers, plasticizers, thickening agents, pigments, water and viscosity stabilizers. All percentages used herein unless otherwise described are weight percentages based on the total system.

Also, within the scope of this invention is a method of treating articles to obtain a thermal heat resistant barrier system. The system is generally useful as a coating for various substrates which are used for fire protection. Further, this system is more effective in high humidity conditions if a suitable, surface seal coat is applied over the cured intumescent based barrier system.

DETAILED DESCRIPTION OF THE INVENTION

The thermal heat resistant barrier system can be used as a coating or to impregnate various substrates to achieve resistance to heat or combustion when fires occur. For example, this system can be used on materials such as fire doors, fire retardant walls or ceilings, motor vehicles, cables, electrical assemblies, airplane fire walls and other such articles that may be subjected to fires. Advantageously, the system can be built up in one coat in an amount of about 0.10 cm to as much as about 1.0 cm wet thickness, more typically of about 0.3 to about 1.0 cm wet thickness as opposed to other systems that require several applications to achieve this level of wet thickness.

This intumescent based thermal barrier system includes a unique combination of an effective amount of silicate solution, an expandable microsphere intumescent agent, and an aluminum silicate. Further, it advantageously and surprisingly does not lose its intumescent properties after being stored for at least about four (4) years. Other optional ingredients are added to further enhance the properties of this composition. While the art has recognized the use of the individual ingredients of the present invention, there is no motivation or teaching in the art to combine these ingredients. Furthermore, the combination of these ingredients pursuant to the present invention, provides synergistic properties that have not been taught before. The process of blending the elements of this barrier system are within the conventional methods used in the art.

Silicate Solution

Useful silicate solutions include, but are not limited to, those derived from potassium silicate, lithium silicate, sodium silicate and other soluble sodium silicates such as sodium metasilicate and so forth. Generally, silicate solutions are present in an amount to provide desirable properties to the resulting composition system, such as providing binding, structural strength, higher volume solids, color, reinforcement, crack resistance, fire resistance and so forth. A suitable silicate solution is sodium silicate commercially available from E. I. Dupont Corp (Wilmington, Del.), Philadelphia Quartz (Philadelphia, Pa.) and P. Q. Corp. (Valley Forge, Pa.). The preferred amount of silicate solution of this invention is about 40–85 wt-%. In a more preferred embodiment, the amount of silicate solution is present in an amount of about 50–85 wt-%, and most preferably in an amount of about 60–80 wt-%.

Intumescent Agent

The composition of the present invention includes an intumescent agent. Intumescent agents are generally used because of their ability to swell or puff up when exposed to flames or high heat, thus providing a barrier between the heat/flames and the substrate to which the intumescent agent has been applied. Suitable intumescent agents include those that are expandable substantially spherical or fire spheres that can be dispersed into the silicate solution and have good alkali resistance. Preferably the particles or spheres have an actual density of 0.01–0.04 g/cc and shell thickness of about 0.02 micrometers. The particles or spheres are preferably made of vinylidene chloride-acrylonitrile copolymer. Examples of suitable expandable substantially spherical particles or fine spheres include, but are not limited to, those known under the trade designation as "Expancel" from Nobel Industries (Marietta, Ga.), or "Micropearl" from Pierce & Stevens Corp., 710 Ohio St., (Buffalo, N.Y.). The preferred amounts of the expandable substantially spherical particles or fine spheres are about 1 . 15 wt-%, more preferably in an amount of about 2–10 wt-%, and most preferably in an amount of about 3–6 wt-%.

Frit Material

Frit materials may be employed to provide resistance at higher temperatures. It can also assist in raising the melt point of the system and stabilizing the intumesed foam. The frit material is present in an amount of about 5–40 wt-%. Most preferably in an amount of about 10–30 wt-%, and most preferably in an amount of about 10–20 wt-%. Typical frit materials include fine clay ($Al_2O_3.2SiO_2.2H_2O$) (mp 1850° C.) and mica ($K_2O$-$Al_2O_3$-$SiO_2$) (mp 1200° C.).

Optional Ingredients

Various other optional ingredients can be added to improve the characteristics of the system and resulting substrates treated by this system. These ingredients will generally be used in amounts that do not alter the desirable properties of the system. Ingredients that may be added include fillers, defoamers, plasticizers, thickening agents, pigments and viscosity stabilizers.

Although the ingredients used in the present invention may be characterized as useful for specific functions, it should be understood that these ingredients are not limited to their typical functions. For example, mica 160 mesh can be used to provide crack resistance, improved intumescense and foam stability, water resistance, as a carbon dioxide barrier and as a filler.

Metal oxides optionally may be used to improve the water resistance. Metal Oxides include Zinc Oxides, Aluminum Trioxide, Magnesium Oxide, and other heavy metal oxides. Examples of suitable zinc oxides are sold under the trade designation "Kadox 15" and "Kadox 911" available from Zinc Corp. of America, (Monaca, Pa.). The preferred amount of metal oxides used in the present invention is about 0.05–1.0 wt-%. A more preferred amount is about 0.1–0.5 wt-% and most preferably in an amount of about 0.1–0.2 wt-%.

In order to obtain certain properties such as crack resistance, water resistance and carbon dioxide barrier effects, plately fillers such as mica may be used. The preferred amount of mica used in the present invention is about 2–30 wt-%, with the more preferred amount of about 3–25 wt-% and most preferably in an amount of about 5–20 wt-%.

Defoamers are generally used to control or prevent foaming during the manufacturing process. Several defoamers or antifoaming agents can be used to provide the desirable characteristics. Examples of typical defoaming agents include, but are not limited to, mineral oil based, organic phosphates, silicone fluids, dimethylpolysiloxane and so forth. Typical defoamers available under the trade designations include "HODAG PX-108" from Calgene Chemical, (Skokie, Ill.) and "Antifoam B", from Dow Corning Co., (Midland, Mich.), the defoamer is present in an amount of about 0.01–1.0 wt-%. More preferably the amount of defoamer in the invention is present in an amount of about 0.02–0.6 wt-%, and most preferably in an amount of about 0.02–0.20 wt-%.

Thickening agents are generally used to increase viscosity and to aid in maintaining stability by their swelling, hydrogen bonding or associative properties. Known thickening agents include starches, gums, casein, gelatin, clays, cellulose derivatives, silicates, stearates and the like. The thickening agent is present in an amount of about 0.2–5.0 wt-%. More preferably the thickening agent is present in an amount of about 0.3–2.0 wt-% and most preferably in an amount of about 0.5–1.0 wt-%.

Viscosity stabilizers include, but are not limited to, potassium hydroxide or sodium hydroxide. The preferred amount of viscosity stabilizer in the present invention is in an amount of about 0–2.0 wt-%, more preferred in an amount of about 0.1–1.5 wt-% and most preferred in an amount of about 0.2–1.0 wt-%.

A pigment or combination of pigments can also be used in the compositions of the present invention to provide color. Generally, pigments can also be used to increase the solids content of the compositions and perform the function of a filler. Generally, any alkali stable inorganic or organic pigment can be used in the compositions of the present invention. The amount of pigment may vary over a wide range. Preferably, it is present in an amount of about 0.1–5.0 wt-%.

Potassium phosphate tribasic is one of the useful plasticizers in the present invention. Others include, but are not limited to, sodium phosphate tribasic, ethylene or propylene glycos, water soluble resins, latexes and simple sugars. The preferred amount of plasticizer useful in the present invention is present in an amount of about 1–10 wt-% and most preferred in an amount of about 2.0–5.0 wt-%.

A surface seal coat may be applied as a coating over the intumescent based thermal barrier system after the system has been cured. This is done in order to prevent the carbon dioxide in the air from reacting with the present invention which over time would raise the melting point of the present invention so that it loses its ability to intumese. Essentially, failure to use a seal coat will not inhibit the properties of the system, but will shorten the shelf life of the present invention. A suitable surface seal coat could be a water based vapor barrier coating. Examples of such are styrene butadiene latex, styrene acrylic latex, and vinylidene copolymer. A suitable product used in the industry is FD 4026 from H. B. Fuller Company, (St. Paul, Minn.).

The process by which the compositions of the present invention are made is as follows: Charge a clean mixer with a silicate solution, then add with mixing, the metal oxide, a defoamer, a thickener, mica, and clay. Shear at high speed for fifteen minutes and then at a slower speed add the viscosity stabilizer and plasticizer. Blend the ingredients and then add water and the intumescent agent. Blend uniformly and adjust the procedures if the viscosity is high by adding sodium silicate and for low viscosity by adding the thickener. The composition is then filtered through a 40 U.S. Mesh and applied to appropriate substrates by methods that include, but are not limited to, troweling, paint spraying or pouring.

EXAMPLES

The following examples are being offered to further illustrate the various aspects of the present invention. They are however, not intended to limit the scope of the present invention.

Both examples 1 and 2 were prepared using the process set forth above.

EXAMPLE #1

| MATERIALS | WEIGHT % |
| --- | --- |
| Sodium Silicate Solution - Silicate Binder ($SiO_2:Na_2O$ = 3.25:1 moles) | 72.62 |
| Kadox 911 - Zinc Oxide | .14 |
| Hodag PX 108 - Defoamer | .05 |
| Lithium Stearate - Thickener | .82 |
| Mica - Crack and Water Resistance | 8.19 |
| Kaopaque 10 - Hydrated Aluminum Silicate | 6.83 |
| HIGH SHEAR SMOOTH, THEN ADD: | |
| 45% Solution KOH | .82 |
| 50% Solution Tripotassium Phosphate | 5.46 |
| Expandable Microspheres | 3.30 |
| Water | 1.77 |
| BLEND UNIFORM | 100.00 |

The coating was troweled onto various substrates, at a dry film thickness of 0.03 cm. After the product had dried to equilibrium, it was fire tested in a horizontal position, face down over a meker burner 1.50 cm directly above the burner. The flame impinged on intumescent coating surface at approximately 705° C. to 815° C. in a draft-free hood. The test was run for 15 minutes, after which the coating was measured for the amounts of expansion, the foam structure, and general integrity.

PROPERTIES:
Weight/Liter: 132 kg/liter
Volume Solids: 58%
Sag Resistance: 3.1 mm
Application: Spray, brush, trowel
Coverage Rate: 2.0–2.9 liters/sq meter (2.0–2.84 mm wt)
Expansion in Fire Test: 5–7 times dry thickness 7.6–12.7 mm
Aging Stability: 5–7 times its dry thickness 7.6–12.7 mm
The sample was treated in December 1991 and was tested in November, 1995, resulting in an expansion fire test.

EXAMPLE #2

| MATERIALS | WEIGHT % |
| --- | --- |
| Sodium Silicate Solution - Silicate Binder (3.25 mole ratio) | 69.13 |
| Kadox 911 - Zinc Oxide | .13 |
| Hodag PX 108 - Defoamer | .03 |
| Lithium Stearate - Thickener | .78 |
| Mica - Crack and Water Resistance | 7.80 |
| Kaopaque 10 - Hydrated Aluminum Silicate | 6.50 |
| HIGH SHEAR SMOOTH, THEN ADD: | |
| 45% Solution KOH | .78 |
| 50% Solution Tripotassium Phosphate | 5.20 |
| Expandable Microspheres | 6.29 |
| Water | 3.36 |
| BLEND UNIFORM | 100.00 |

The coating was applied to various substrates, at a dry film thickness of 0.03 cm. After the product had dried to equilibrium, it was fire tested in a horizontal position, face down over a meker burner 1.50 cm directly above the burner. The flame impinged on intumescent coating surface at approximately 705° C. to 815° C. in a draft-free hood. The test was run for 15 minutes, after which the coating was measured for the amounts of expansion, the foam structure, and general integrity.

PROPERTIES:
Weight/Liter: 1.32 kg/liter
Volume Solids: 55%
Sag Resistance: 3.1 mm thickness
Application: Spray, brush, trowel
Coverage Rate: 2.0–2.9 liters/sq meter 2.0–2.84 mm wet
Expansion in Fire Test: 8–12 times dry thickness (1.3 mm at 2.5 liters/sq meters)

Sag Resistance was measured by using an aluminum panel and an aluminum template of 3.1 mm thickness.

The sample was troweled onto the template at a thickness of 3.1 mm. The template was removed and the aluminum panel was placed in a vertical position and immediately observed for slump.

I claim:

1. An intumescent thermal barrier composition which comprises:

(a) a silicate solution having dispersed therein;

(b) an expandable substantially spherical intumescent agent; and (c) a frit material.

2. The intumescent thermal barrier composition of claim 1 wherein the silicate solution is present in an amount of about 40–85 wt-%.

3. The intumescent thermal barrier composition of claim 1 wherein the silicate solution comprises sodium silicate.

4. The intumescent thermal barrier composition of claim 1 wherein the expandable substantially spherical intumescent agent is present in an amount of about 1–15 wt-%.

5. The intumescent thermal barrier composition of claim 1 wherein the expandable substantially spherical intumescent agent comprises vinylidene chloride acrylonitrile copolymer.

6. The intumescent thermal barrier composition of claim 1 which further comprises an ingredient selected from a group consisting of a defoamer, a thickening agent, a viscosity stabilizer, a plasticizer, a pigment and mixtures thereof.

7. The intumescent thermal barrier composition of claim 6 wherein the stabilizer is selected from a group consisting of sodium hydroxide, potassium hydroxide and mixtures thereof.

8. The intumescent thermal barrier composition of claim 6 wherein the plasticizer is selected from a group consisting of potassium tribasic, sodium phosphate tribasic, ethylene glycol, propylene glycol, water soluble resins, latexes, simple sugars and mixtures thereof.

9. The intumescent thermal barrier composition of claim 1 wherein the frit material is selected from a group consisting of clay, mica and mixtures thereof.

10. The intumescent thermal barrier composition of claim 1 wherein the system can be built up in one coat to as much as 1.0 cm wet thickness.

11. The intumescent thermal barrier composition of claim 1 wherein the silicate solution is present in an amount of about 40–85 wt-%, an expandable substantially spherical intumescent agent in an amount of about 1–15 wt-%, and about 5–40 wt-% of frit material.

12. The intumescent thermal barrier composition of claim 1 wherein the system retains its ability to expand in a fire to about 5–7 times its thickness after being stored for at least about 4 years.

13. The intumescent thermal barrier composition of claim 1 wherein the system expands in a fire to about 5–7 times its original thickness.

14. The intumescent thermal barrier composition of claim 1 wherein the system has a solids content of about 60 wt-% of the total system.

15. The intumescent thermal barrier composition of claim 1 wherein, when the system is applied to a substrate at about 3 mm thickness, the system does not sag.

16. The intumescent thermal barrier composition of claim 1 wherein the ingredients are mixed, filtered and applied to a substrate.

17. A method of providing a substrate with thermal barrier protection comprising applying a coating of a composition as in claim 1 to the substrate and allowing the composition to dry.

18. An article comprising a surface coated with a layer of about 0.10–1.0 cm wet thickness basis of a thermal barrier composition, wherein the composition comprises:

(a) a silicate solution having dispersed therein;

(b) an expandable substantially microsphere intumescent agent; and (c) a frit material, the coating having been prepared by applying the composition to the article and then drying the applied composition.

19. The article of claim 18 which further comprises a seal coat overlying said thermal barrier composition coating.

20. The article of claim 19 wherein the seal coat is a water based vapor barrier coating.

21. An intumescent thermal barrier composition which comprises:

(a) about 60–80 wt-% of a silicate solution;

(b) about 1.0–10 wt-% of an expandable substantially microsphere intumescent agent; and (c) about 10–30 wt-% of a frit material, the components (b) and (c) being dispersed in the silicate solution (a).

* * * * *